United States Patent

Yamashita et al.

[11] Patent Number: 5,907,224
[45] Date of Patent: May 25, 1999

[54] ABNORMALITY DETECTING CIRCUIT FOR DISCHARGE LAMP WITH DELAYED INTERRUPTION FOR UNDERVOLTAGE

[75] Inventors: Masayasu Yamashita; Atsushi Toda; Goichi Oda, all of Shimizu, Japan

[73] Assignee: Koito Manufacturing Co., Ltd., Tokyo, Japan

[21] Appl. No.: 08/798,173

[22] Filed: Feb. 10, 1997

[30] Foreign Application Priority Data

Feb. 29, 1996 [JP] Japan .................................. 8-069324

[51] Int. Cl.⁶ .................................................. H05B 37/00
[52] U.S. Cl. ...................... 315/308; 315/82; 315/DIG. 7; 315/360; 307/10.8
[58] Field of Search .................................. 315/307, 308, 315/82, DIG. 7, 360; 307/10.8

[56] References Cited

U.S. PATENT DOCUMENTS

| | | | |
|---|---|---|---|
| 5,068,570 | 11/1991 | Oda et al. | 315/128 |
| 5,140,229 | 8/1992 | Yagi et al. | 315/307 |
| 5,142,203 | 8/1992 | Oda et al. | 315/308 |
| 5,151,631 | 9/1992 | Oda et al. | 315/127 |
| 5,212,428 | 5/1993 | Sasaki et al. | 315/308 |
| 5,278,452 | 1/1994 | Matsumoto et al. | 307/10.8 |
| 5,295,036 | 3/1994 | Yagi et al. | 361/79 |
| 5,317,237 | 5/1994 | Allison et al. | 315/307 |
| 5,422,548 | 6/1995 | Yamashita et al. | 315/308 |
| 5,449,973 | 9/1995 | Yamashita et al. | 315/82 |
| 5,485,059 | 1/1996 | Yamashita et al. | 315/307 |
| 5,486,740 | 1/1996 | Yamashita et al. | 315/308 |
| 5,514,935 | 5/1996 | Oda et al. | 315/82 |

FOREIGN PATENT DOCUMENTS

| | | |
|---|---|---|
| 4017415 | 2/1991 | Germany . |
| 4129557 | 9/1991 | Germany . |
| 4143464 | 2/1992 | Germany . |
| 4134537 | 4/1992 | Germany . |
| 4309218 | 9/1993 | Germany . |
| 19622803 | 12/1996 | Germany . |

*Primary Examiner*—Arnold Kinkead
*Attorney, Agent, or Firm*—Fitzpatrick, Cella, Harper & Scinto

[57] ABSTRACT

A lighting circuit for a discharge lamp comprises abnormality detection means for detecting an input voltage and/or an input current to be input to a lighting circuit from a power supply and stopping power supply to a discharge lamp when detecting an abnormality in the value of the input voltage and/or the value of the input current. First and second reference values or reference ranges for comparison (the first reference value or reference range is smaller than the second reference value or reference range) are set for the input voltage and/or the input current. When the state where the value of the input voltage and/or the value of the input current is equal to or smaller than the first reference value or the first reference range continues for a predetermined time or longer, the abnormality detection means stops power supply to the discharge lamp. When the state where the value of the input voltage and/or the value of the input current is equal to or greater than the second reference value or the second reference range continues for a predetermined time or longer, the abnormality detection means permits power supply to the discharge lamp.

10 Claims, 6 Drawing Sheets

ABNORMALITY DETECTING CIRCUIT FOR DISCHARGE LAMP WITH DELAYED INTERRUPTION FOR UNDERVOLTAGE

BACKGROUND OF THE INVENTION

1. Field of the Invention

The present invention relates to a novel discharge lamp lighting circuit, which protects a lighting circuit or a discharge lamp from an abnormal operation originated from variations in an input voltage and an input current to be supplied to the lighting circuit from a power supply.

2. Description of the Related Art

Recently, a compact discharge lamp (e.g., a metal halide lamp) is receiving greater attention as a light source which takes the place of an incandescent lamp. It is known that a lighting circuit for such a discharge lamp, as adapted to a light source for a vehicular lamp, includes a DC power supply, a switching power supply circuit, a DC-AC converter, and an igniter circuit.

It is known that variations in the input voltage and input current to a lighting circuit from a power supply may adversely affect the operation of the lighting circuit and the lighting state of a discharge lamp. There is a circuit structure which is designed in view of such phenomenon and which has a predetermined reference value for comparison set for the input voltage or the like and stops power supply to a discharge lamp when the input voltage or the like exceeds or falls below this reference value.

When a short cyclic variation occurs in the input voltage or the input current, however, this circuit causes flickering of a discharge lamp by frequently repeating power supply to the discharge lamp and the inhibition of such power supply. This reduces the visibility of the light from the discharge lamp and may adversely affect the service life of the discharge lamp.

When a sudden drop of the input voltage and/or the input current temporarily occurs, this lighting circuit instantaneously inhibits power supply to a discharge lamp to inevitably turn off the discharge lamp even in the case where the discharge lamp can be kept lit if the input voltage and/or the input current is restored to the proper level immediately after the sudden and temporary drop.

SUMMARY OF THE INVENTION

Accordingly, it is an objective of the present invention to provide a discharge lamp lighting circuit which is designed to prevent an adverse effect on the service life of a discharge lamp and reduction in visibility of light therefrom from occurring when an abnormality in the input voltage and/or the input current is detected.

To achieve this object, there is provided a lighting circuit for a discharge lamp according to this invention comprising abnormality detection means for detecting an input voltage and/or an input current to be input to a lighting circuit from a power supply and stopping power supply to a discharge lamp when detecting an abnormality in the input voltage and/or the input current, the abnormality detection means having a first reference value or reference range for comparison and a second reference value or reference range both to be set for the input voltage and/or the input current, whereby the abnormality detection means stops power supply to the discharge lamp when a state where a value of the input voltage and/or a value of the input current is equal to or smaller than the first reference value or the first reference range continues for a predetermined time or longer, and permits power supply to the discharge lamp when a state where the value of the input voltage and/or the value of the input current is equal to or greater than the second reference value or the second reference range continues for a predetermined time or longer.

According to this invention, power supply to a discharge lamp is inhibited when and only when the state where the value of the input voltage and/or the value of the input current is equal to or smaller than the first reference value or the first reference range continues for a predetermined time or longer. When a short cyclic variation occurs in the input voltage or the input current, therefore, power supply to the discharge lamp is not stopped if the cycle is shorter than a predetermined time, thus preventing power supply to the discharge lamp and inhibition of power supply from being repeated in a short period.

Even when a sudden drop of the input voltage or the like temporarily occurs, power supply to the discharge lamp is not instantaneously stopped so that the discharge lamp can be kept lit by supplying power to the discharge lamp if the input voltage or the like is promptly restored to the proper level immediately after the sudden and temporary drop.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENT

The present invention will be described below with reference to FIGS. 1 through 4.

Figure 1:
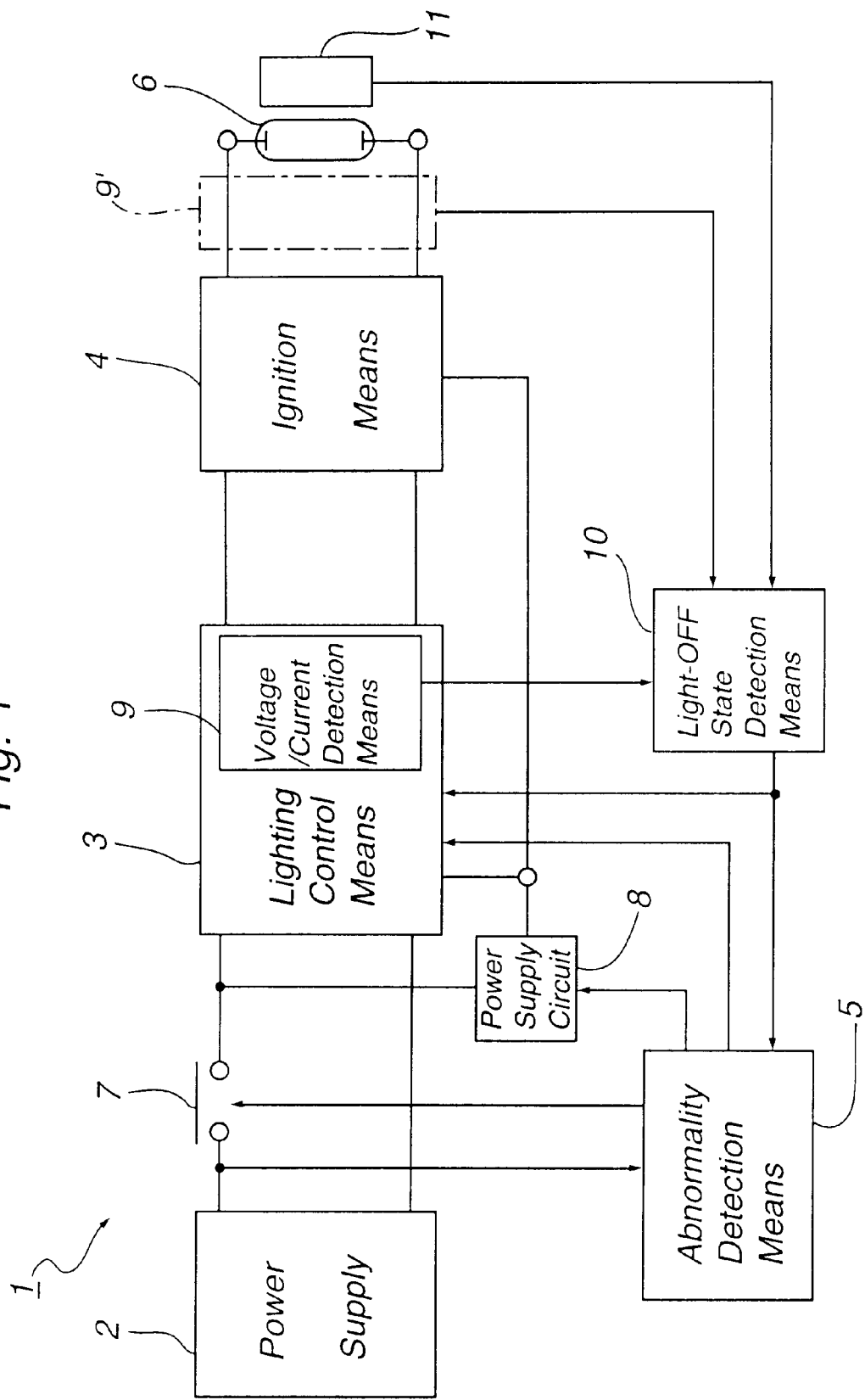
FIG. 1 is a circuit block diagram for explaining the structure of a lighting circuit for a discharge lamp according to this invention.

FIG. 1 illustrates the structure of a discharge lamp lighting circuit 1 according to this invention, which comprises a power supply 2, lighting control means 3, ignition means 4 and abnormality detection means 5.

The lighting control means 3 is provided to mainly execute power control necessary for the ignition of a discharge lamp 6 based on the power supply 2. The output of the lighting control means 3 is sent via the ignition means 4 to the discharge lamp 6.

The ignition means 4 serves to generate a trigger pulse for the discharge lamp 6 in the initial lighting stage to ignite the discharge lamp 6.

The abnormality detection means 5 serves to detect an abnormality in the input voltage and/or the input current to be supplied to the lighting control means 3 from the power supply 2, i.e., an excess state of the input voltage and/or the input current or an abnormal drop thereof, and inhibit power supply to the discharge lamp 6 upon detection of such an abnormality.

Power supply to the discharge lamp 6 may be inhibited by the following schemes:

(I) To cut off power supply to the lighting control means 3 from the power supply 2.

(II) To stop the operation of the lighting control means 3.

With regard to the scheme (I), switch means 7 may be provided between the power supply 2 and the lighting control means 3 as shown in, for example, FIG. 1, so that upon detection of an abnormality, the switch means 7 is opened to cut off power supply to the lighting control means 3.

The scheme (II) may be accomplished by inhibiting control for power supply to the discharge lamp 6, a voltage conversion process or the like in response to a signal which is sent to the lighting control means 3 from the abnormality detection means 5, or stopping the operation of a power supply circuit 8 for supplying a voltage needed for the components of the lighting control means 3 or making the supply voltage to zero.

The power cutoff technique in this invention is not limited to those mentioned above and any other technique can be used so long as it can stop power supply to the discharge lamp 6 when an abnormality is detected. One way to stop power supply to the discharge lamp upon detection of an abnormality is to temporarily inhibit power supply to the discharge lamp 6 after the occurrence of an abnormality and restart supplying power to the discharge lamp 6 when the value of the input voltage and/or the value of the input current is restored to the proper level.

The abnormality detection means 5 detects the input voltage and/or the input current to the lighting circuit 1, compares the detected level with a predetermined reference value to check which is greater or smaller (equilibrium state included in some case), and monitors the occurrence of an abnormality by determining if a certain comparison result continues for a predetermined time or longer. The abnormality detection means 5 determines how long an abnormality should continue in order to stop or restart power supply to the discharge lamp 6.

Figure 2:
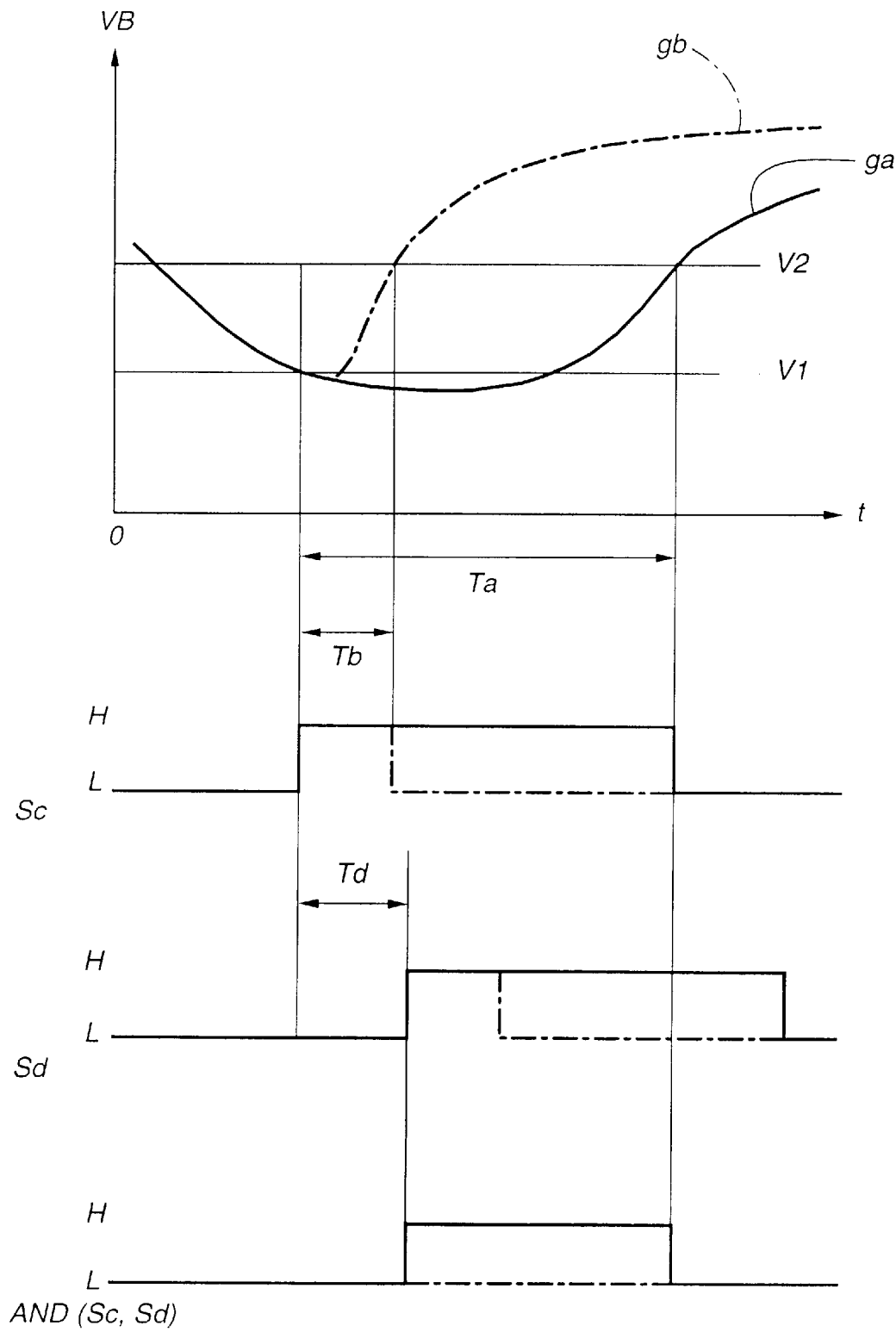
FIG. 2 is a diagram for explaining how to set reference values for comparison with respect to the input voltage and an abnormality determining process.

FIG. 2 exemplifies a time-dependent change in an input voltage ("VB") and is used to explain how to set reference values for comparison ("V2" indicating the upper limit while "V1" indicates the lower limit) with respect to the input voltage and the operation for detecting an abnormality in the input voltage.

The graph in the upper part of FIG. 2 exemplifies a time-dependent change in the input voltage VB, with time t taken on the horizontal scale and the input voltage VB taken on the vertical scale in this diagram. A curve ga indicated by the solid line shows an example of the case where after VB falls below the reference value V2 and becomes equal to or smaller than the reference value V1 due to a voltage drop, the voltage is restored to become V2 or higher after the passage of a time Ta. A curve gb indicated by the alternate long and short dash line shows the same change as the curve ga until a certain point at which VB becomes equal to or smaller than V1 due to a voltage drop, but shows VB becoming equal to or greater than V2 after the passage of a time Tb (<Ta) because of quick voltage restoration.

In the time chart shown at the lower portion of FIG. 2, a signal "Sc" is defined by the result of comparison of VB with V1 or V2. This signal Sc becomes an H (High) signal when VB falls from the state of being equal to or greater than V1 to become VB<V1 and becomes an L (Low) signal when VB rises from the state of being equal to or smaller than V2 to become VB>V2. A signal "Sd" is the signal Sc delayed by a predetermined time ("Td" where Tb<Td<Ta). A signal "AND(Sc, Sd)" is an abnormality determination signal acquired by taking a logical product of the signals Sc and Sd. Power supply to the discharge lamp 6 is stopped when this signal AND(Sc, Sd) has an H level, while power supply to the discharge lamp 6 is permitted when the signal AND(Sc, Sd) has an L level.

When VB changes as indicated by the curve ga, the signals Sc, Sd and AND(Sc, Sd) behave as indicated by the solid lines, the H periods of the signals Sc and Sd become Ta and the H period of the signal AND(Sc, Sd) becomes Ta-Td.

When VB changes as indicated by the curve gb, the signals Sc, Sd and AND(Sc, Sd) behave as indicated by the alternate long and short dash line, and the H periods of the signals Sc and Sd become Tb where Td>Tb, so that the signal AND(Sc, Sd) becomes an L level.

In other words, when the time for VB<V1 caused by a temporary drop of VB is short, AND(Sc, Sd) remains at the L level, so that even if VB fluctuates around V1 in a short cycle, power supply to the discharge lamp 6 and inhibition of the power supply are not repeated frequently. When VB becomes less than V1, power supply to the discharge lamp 6 is inhibited after the passage of the time Td, not immediately, so that power supply to the discharge lamp 6 is not stopped when VB is restored to the proper level before the elapse of the time Td. It is therefore possible to execute such control as to assist the lighting of the discharge lamp 6 as much as possible when the discharge lamp 6 is expected to keep the light-ON state by the restoration of VB.

Although a delay time is set for the signal Sc with respect to the reference value V1 in the foregoing description, a delay time at the falling of the signal Sc may be set with respect to the reference value V2.

According to the method of detecting only a variation in VB, the inhibition and permission of power supply to the discharge lamp 6 are performed regardless of the light-ON state or the light-OFF state of the discharge lamp. It is thus possible to add the light-OFF state of the discharge lamp as a detection parameter in detecting an abnormality.

Specifically, power supply control is performed in such a manner that power supply to the discharge lamp 6 is not inhibited while the discharge lamp 6 is being lit even when VB is less than V1, and power supply to the discharge lamp 6 is stopped when the light-OFF state of the discharge lamp 6 is detected and when the state of VB<V1 continues for a predetermined time or longer.

The light-OFF state of the discharge lamp may be detected by the following schemes.

(1) Determine the light-OFF state based on a detection signal associated with the voltage and/or current applied to the discharge lamp or a control voltage and/or a control current equivalent to the applied voltage and/or current.

(2) Detect that the discharge lamp is not emitting light.

With regard to the scheme (1), as shown in FIG. 1, voltage/current detection means 9 for acquiring a detection signal equivalent to the lamp voltage and/or the lamp current of the discharge lamp 6 may be provided in the lighting control means 3, or voltage/current detection means 9' may be provided in the ignition means 4 or at the subsequent stage thereof in order to detect the lamp voltage and/or the lamp current of the discharge lamp 6 more directly, and the detection signal from the voltage/current detection means 9 or 9' may be sent to a light-OFF state detection means 10. That is, the light-OFF state detection means 10 compares the detected voltage and/or the detected current concerning the discharge lamp 6 with a predetermined reference value for comparison to detect the light-OFF state of the discharge lamp 6.

The scheme (2) detects the light emission from the discharge lamp 6 directly or indirectly. This scheme may be accomplished by providing a photosensor 11 for detecting the light from the discharge lamp 6 and sending the output signal of the photosensor 11 to the light-OFF state detection means 10 whereby the light-OFF state of the discharge lamp 6 is determined when the level of that output signal is less than a predetermined reference value for comparison, or by detecting the ambient temperature of the discharge lamp 6 or the temperature of a member provided near the discharge lamp 6 (e.g., the reflector or lens, the light-shielding member or the like) and determining the light-OFF state of the discharge lamp 6 when the temperature is lower than a predetermined value.

The above-described method of setting a plurality of reference values for comparison with respect to the input voltage and setting predetermined determination times for some of the reference values can be applied not only to the detection of an abnormality originated from a decrease in the input voltage but also to the detection of an abnormality originated from an increase in the input voltage.

Figure 3:
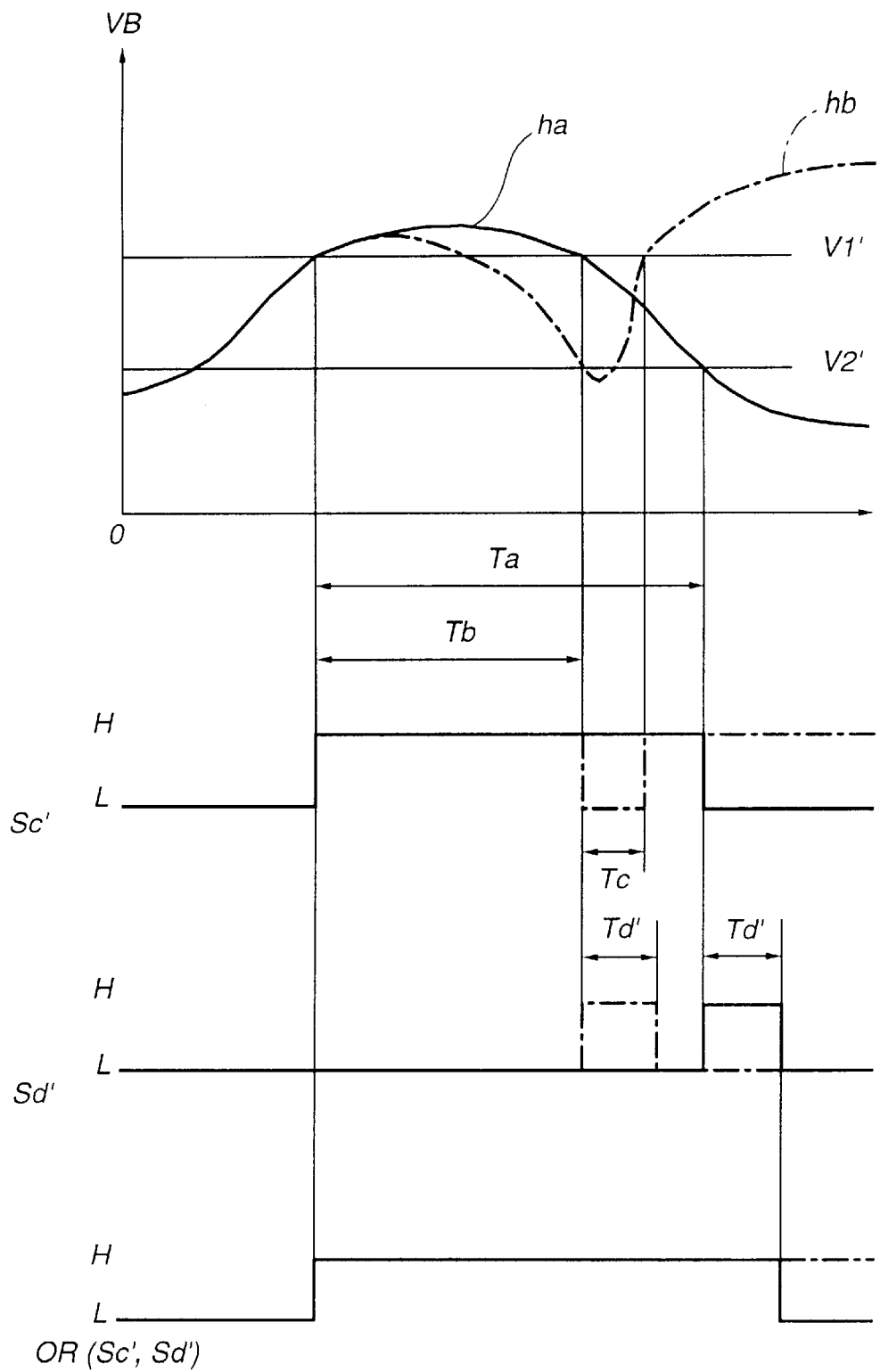
FIG. 3 is a diagram for explaining how to set reference values for comparison which are associated with the detection of the overvoltage state of the input voltage and an abnormality determining process also associated with this detection.

In the t vs. VB graph shown at the upper portion of FIG. 3, a curve ha indicated by the solid line shows an example of the case where after VB rises above a reference value V1' due to an increase in the voltage, it becomes equal to or smaller than V2' (<V1') after the passage of the time Ta. A curve hb indicated by the alternate long and short dash line shows the same change as the curve ha until a certain point at which VB rises to become equal to or greater than V1', but shows VB becoming equal to or smaller than V2' after the passage of the time Tb (<Ta) and then soon become equal to or above V1'.

In the time chart shown at the lower portion of FIG. 3, a signal "Sc" is defined by the result of comparison of VB with V1' or V2'. This signal Sc' becomes an H signal when VB rises from the level equal to or smaller than V1' to become VB>V1', and becomes an L signal when VB falls from the level equal to or greater than V2' to become VB<V2'. A signal "Sd" is the signal Sc' delayed by a predetermined time ("Td") in synchronism with the falling of the signal Sc'. A signal "OR(Sc', Sd')" is an abnormality determination signal acquired by taking a logical sum of the signals Sc' and Sd'. Power supply to the discharge lamp is stopped when this signal OR(Sc', Sd') has an H level, while power supply to the discharge lamp is permitted when the signal OR(Sc', Sd') has an L level.

When VB changes as indicated by the curve ha, the signals Sc', Sd' and OR(Sc', Sd') behave as indicated by the solid lines, the H periods of the signals Sc' and Sd' respectively become Ta and Ta+Td', and the H period of the signal OR(Sc', Sd') becomes Ta+Td'.

When VB changes as indicated by the curve hb, the signals Sc', Sd' and OR(Sc', Sd') behave as indicated by the alternate long and short dash line. The signal Sc' has an L period indicated by "Tc", the H period of the signal Sd' becomes Tb+Td', so that the signal OR(Sc', Sd') becomes an H-level signal after the point when VB becomes equal to or greater than V1' (VB>V1' for the first time.

In the case where even when VB becomes smaller than V2' due to a temporary voltage drop, VB soon exceeds V1', it is unnecessary to promptly restart power supply to the discharge lamp. Even when VB fluctuates near V1' in a short period, therefore, power supply to the ignition switch and inhibition of such power supply are not repeated frequently. When VB becomes equal to or greater than V1', it is desirable to instantaneously stop supplying power to the discharge lamp to protect the circuit from the dangerous overvoltage. When VB falls below V2', it is desirable to restart power supply to the discharge lamp after the passage of the time Td', not to immediately supply power to the discharge lamp, to check if VB does not rise again within this time Td'. As apparent from the above, power supply control can be executed in such a way as to wait for VB to become equal to or smaller than V2' with respect to a variation in VB within a high voltage range, thus preventing the discharge lamp or the lighting circuit from becoming an abnormal state.

Figure 4:
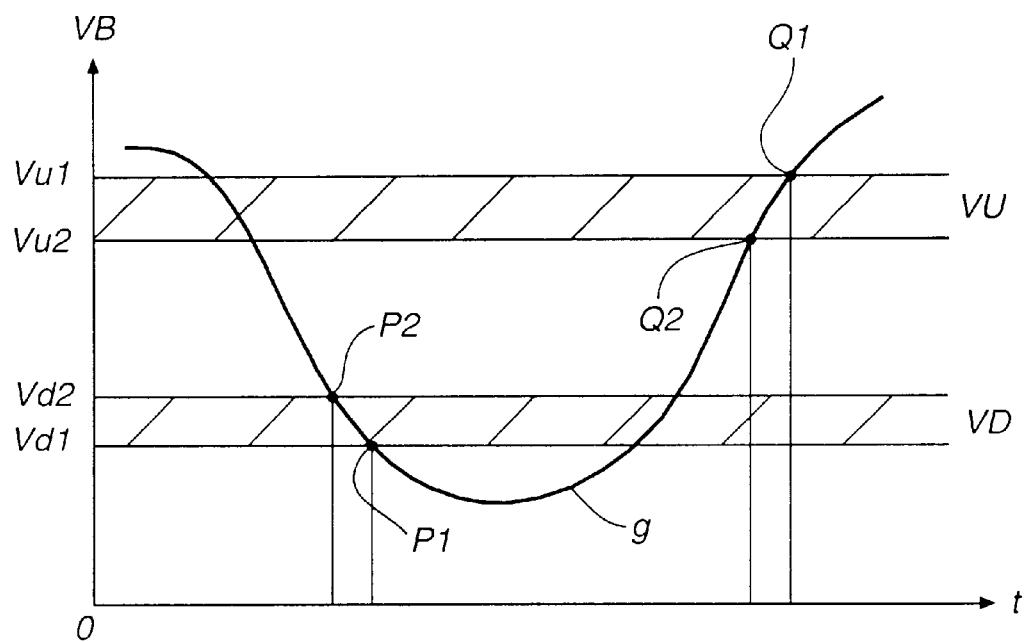
FIG. 4 is a diagram for explaining how to set a reference range for comparison with respect to the input voltage.

This invention is not limited to the above-described case where reference values for comparison are set for the input voltage as illustrated in FIGS. 2 and 3. For instance, reference ranges VU and VD may be set as shown in FIG. 4. The reference range VU is used to determine if the input voltage becomes higher than necessary ("Vu1" indicating the upper limit of the range while "Vu2" indicates the lower limit thereof). The reference range VD is used to determine if the input voltage becomes abnormally lower ("Vd2" indicating the upper limit of the range while "Vd1" indicates the lower limit thereof). Although a curve g indicating a change in the level of VB crosses the lines indicating the upper limit Vd2 and lower limit Vd1 of VD at points P2 and P1, respectively, the determination times associated with level comparison at the individual points can be set to proper values separately. With regard to points Q1 and Q2 at which the curve g crosses the lines indicating the upper limit Vu1 and lower limit Vu2 of VU, the determination time associated with level comparison for the lower limit Vu2 can be set. This is because power supply to the discharge lamp should be stopped immediately to guarantee the safety of the discharge lamp and the circuit operation when the input voltage VB exceeds Vu1, whereas no problem arises if a certain time is given until the inhibition of power supply to the discharge lamp when Vu2<VB<Vu1.

Although the foregoing description referring to FIGS. 2 and 3 has been given with reference to the example where an abnormality in the input voltage to the lighting circuit 1 is detected, it is needless to say that with regard to the detection of an abnormality in the input current to the lighting circuit 1, a plurality of reference values or reference ranges for comparison can be set and their associated determination times can be set similarly.

Figure 5:
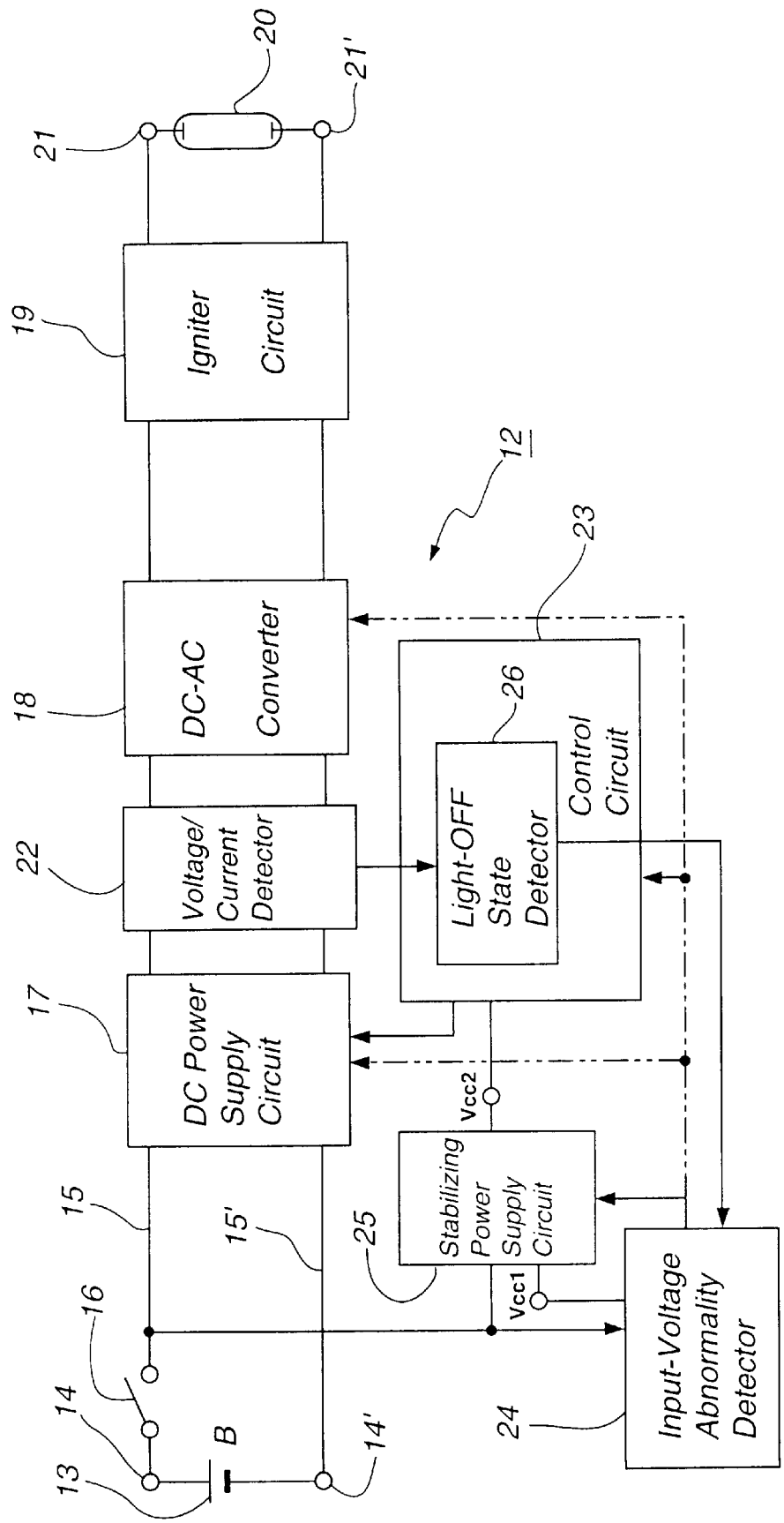
FIG. 5 is a circuit block diagram illustrating one embodiment of this invention.
Figure 6:
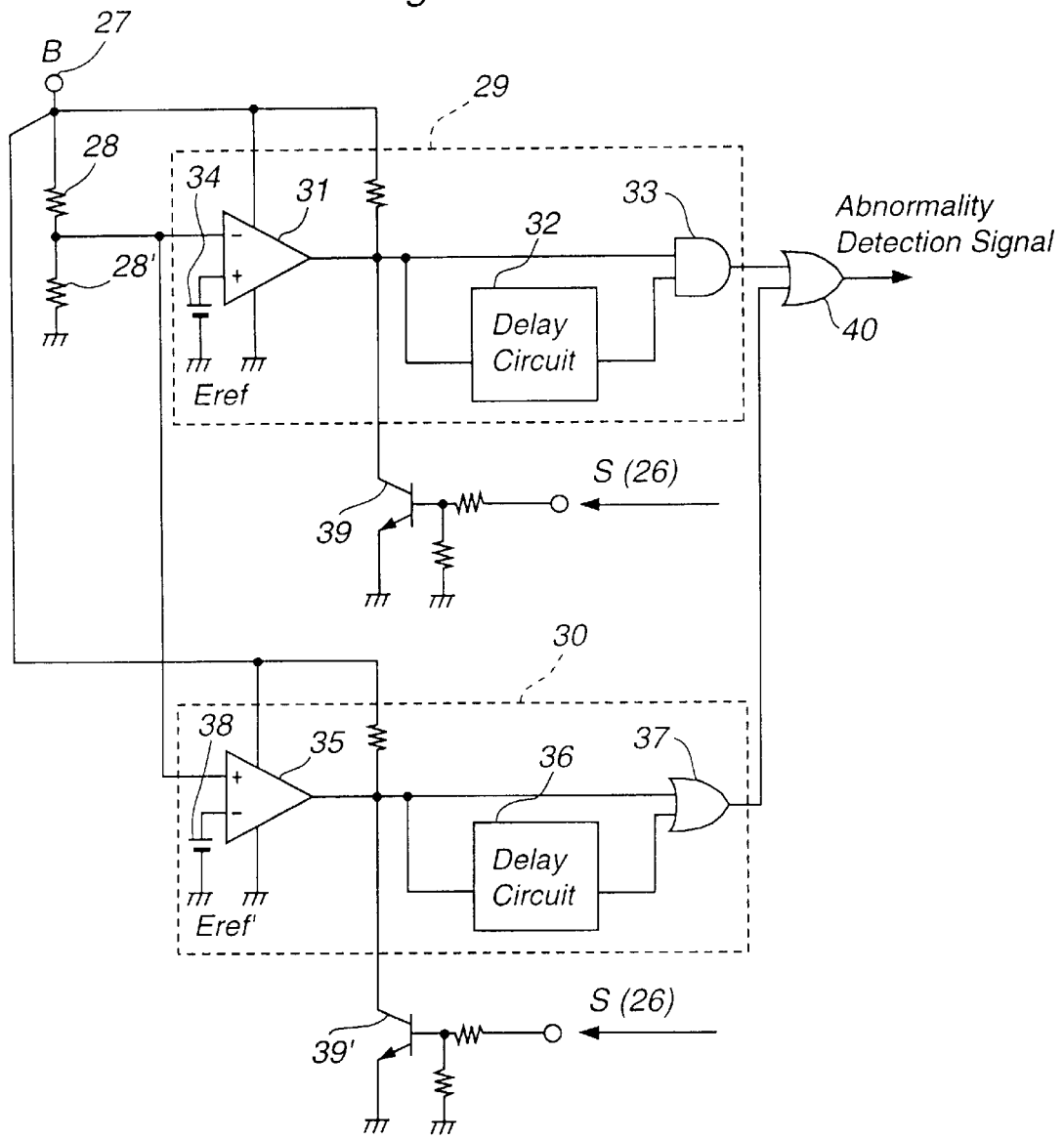
FIG. 6 is a circuit diagram exemplifying the structure of an input-voltage abnormality detector.

FIGS. 5 through 7 illustrate one embodiment of this invention.

In a lighting circuit 12, a battery 13 equivalent to the aforementioned power supply 2 is connected between input terminals 14 and 14' and an ignition switch 16 is provided as a manual switch on one line (15) of DC power lines 15 and 15'.

A DC power supply circuit 17 to which the battery voltage is input, boosts and/or reduces the battery voltage and sends its output to a DC-AC converter 18 located at the subsequent stage.

The DC-AC converter 18 converts the DC voltage output from the DC power supply circuit 17 to an AC voltage. For example, the DC-AC converter 18 may be designed to comprise a bridge circuit having plural pairs of semiconductor switch elements positioned on the power supply path to a discharge lamp 20 and a drive controller for driving this bridge circuit.

An igniter circuit 19, located at the subsequent stage of the DC-AC converter 18, generates a trigger pulse to the discharge lamp 20, connected between AC output terminals 21 and 21', superimposes this trigger pulse onto the output of the DC-AC converter 18, and applies the resultant signal to the discharge lamp 20. The igniter circuit 19 is equivalent to the ignition means 4.

Provided between the DC power supply circuit 17 and the DC-AC converter 18 is a voltage/current detector 22 (equivalent to the aforementioned voltage/current detection means 9) for detecting the output voltage and output current of the DC power supply circuit 17. The voltage/current detector 22 sends a detection signal to a control circuit 23 and an input-voltage abnormality detector 24.

The control circuit 23 generates a control signal according to the detection signal from the voltage/current detector 22, and sends the control signal to the DC power supply circuit 17 to control the output voltage thereof. In this manner, the control circuit 23 performs power control which matches with the ignition state of the discharge lamp 20 to shorten the ignition time and re-ignition time and stably light the discharge lamp 20 in the steady lighting mode. The control circuit 23 can take not only a pulse width modulation type structure, but also another structure as well.

The input-voltage abnormality detector 24 serves to detect the overvoltage state of the battery voltage or an abnormal drop thereof. When detecting an abnormality, the input-voltage abnormality detector 24 stops the operation of a stable power supply circuit 25 which supplies the necessary supply voltage or reference voltage to the control circuit 23 and other circuits, thereby inhibiting power supply to the discharge lamp 20 (see the above-discussed scheme (II)).

The stable power supply circuit 25, functioning as a circuit in a different system from the power supply path to the discharge lamp 20, generates stable voltages based on the battery voltage and supplies the necessary voltages to the individual components of the lighting circuit 12. This power supply 25 receives the battery voltage at the subsequent stage of the ignition switch 16, In FIG. 5, the stable power supply circuit 25 generates voltages Vcc1 and Vcc2, and supplies the former to the input-voltage abnormality detector 24 and the latter as the supply voltage or a predetermined reference voltage (or its original voltage) to the control circuit 23, the DC-AC converter 18, etc. When an abnormality is detected, Vcc2 becomes zero. Since the method of stopping the operation of the stable power supply circuit 25 or inhibiting the supply of the voltages generated by this power supply circuit 25 can make a current change small when the power supply is stopped, as compared with the method of stopping power supply to the DC power supply circuit 17 from the battery 13, the former method can allow the use of components which have smaller breakdown currents or lower heat resistances and is thus advantageous from the viewpoint of the manufacturing cost. This invention is not limited to this particular method and may be adapted to a method for disabling the lighting control operation by directly stopping the operations of the DC power supply circuit 17, the DC-AC converter 18 and the control circuit 23, as indicated by the alternate one and two dashes lines in FIG. 5.

A light-OFF state detector 26, provided in the control circuit 23, detects based on the detection signal from the voltage/current detector 22 if the discharge lamp 20 is in the light-OFF state (see the above-discussed scheme (1)), and sends a signal indicative of the light-OFF state of the discharge lamp 20 to the input-voltage abnormality detector 24.

FIG. 6 exemplifies the structures of the essential portions of the input-voltage abnormality detector 24.

The battery voltage ("B") is supplied to a terminal 27, and is divided by resistors 28 and 28'. The divided voltage is supplied to a circuit 29 associated with the detection of a voltage drop and a circuit 30 associated with the detection of an overvoltage.

The circuit 29 has a comparator 31, a delay circuit 32 and a 2-input AND gate 33. The divided voltage acquired by the resistors 28 and 28' is supplied to the negative input terminal of the comparator 31 while a reference voltage ("Eref") generated by a stable voltage generator 34 is supplied to the positive input terminal of the comparator 31. Note that the comparator 31 has a hysteresis characteristic.

The comparator 31 has its output terminal connected via a resistor to the terminal 27, and sends its output signal to one input terminal of the AND gate 33 directly and to the other input terminal of the AND gate 33 via the delay circuit 32.

The circuit 30 has a comparator 35, a delay circuit 36 and a 2-input OR gate 37. The divided voltage acquired by the resistors 28 and 28' is supplied to the positive input terminal of the comparator 35 while a reference voltage ("Eref") generated by a stable voltage generator 38 is supplied to the negative input terminal of the comparator 35. Note that the comparator 35 also has a hysteresis characteristic.

The comparator 35 has its output terminal connected via a resistor to the terminal 27, and sends its output signal to one input terminal of the OR gate 37 directly and to the other input terminal of the OR gate 37 via the delay circuit 36. The delay circuit 36 produces a delay pulse of a predetermined period which is synchronous with the falling of the output signal of the comparator 35.

Emitter-grounded transistors 39 and 39' have bases supplied with the output signal of the light-OFF state detector 26. This output signal, denoted by "S(26)", has an H level when the light-ON state of the discharge lamp 20 is detected and has an L level when the light-OFF state of the discharge lamp 20 is detected. The collector of the transistor 39 is connected to the output terminal of the comparator 31, while the collector of the other transistor 39' is connected to the output terminal of the comparator 35.

The output signals of the AND gate 33 and the OR gate 37 are input to a 2-input OR gate 40 whose output signal serves as an abnormality detection signal associated with the battery voltage B. Power supply to the discharge lamp 20 is inhibited when the abnormality detection signal has an H level and power supply to the discharge lamp 20 is permitted when the abnormality detection signal has an L level.

When the battery voltage B is low and the divided voltage acquired by the resistors 28 and 28' is smaller than the reference voltage Eref of the comparator 31, the output of the comparator 31 goes high (H) and the light-OFF state of the discharge lamp 20 is detected this time. When the output signal S(26) of the light-OFF state detector 26 is at the L level, the logical product of the output signal of the comparator 31 and the output signal of the delay circuit 32 goes high after the elapse of the delay time, inhibiting power supply to the discharge lamp 20. When the battery voltage B rises later and the divided voltage exceeds the upper reference value associated with the comparator 31, the output signal of the comparator 31 goes low (L). Since the logical product of this L-level signal and the output signal of the delay circuit 32 becomes an L-level signal, power supply to the discharge lamp 20 is allowed.

When the battery voltage B is excessively large and the divided voltage acquired by the resistors 28 and 28' is greater than the reference voltage Eref' of the comparator 35, the output of the comparator 35 goes high and the light-OFF state of the discharge lamp 20 is detected this time. When the output signal S(26) of the light-OFF state detector 26 is at the L level, the logical product of the output signal of the comparator 35 and the output signal of the delay circuit 36 becomes an H-level signal, inhibiting power supply to the discharge lamp 20. When the battery voltage B falls later and the divided voltage becomes less than the lower reference value associated with the comparator 35, the output signal of the comparator 35 goes low. Since the logical product of this L-level signal and the output signal of the delay circuit 36 becomes an L-level signal after the passage of the delay time, power supply to the discharge lamp 20 is allowed.

When the light-ON state of the discharge lamp 20 is detected and the signal S(26) has an H level, the transistor 39 is turned on, forcing the output potentials of the comparators 31 and 35 to the L level.

When the variation period of the battery voltage B has a certain length, power supply to the discharge lamp 20 and the inhibition of the power supply are performed alternately. In such a case, if one intends to flicker the discharge lamp 20 at the desired period by operating the ignition switch 16, the delay times of the delay circuits 32 and 36 should be set to such values as to provide the flickering period of the discharge lamp that does not appear strange with respect to the intended period.

According to the first and second aspects of the invention, as apparent from the foregoing description, power supply to a discharge lamp is inhibited or permitted when and only when the state where the value of the input voltage and/or the input current to the lighting circuit is equal to or smaller than a predetermined reference value or reference range continues for a predetermined time or longer. When a short cyclic variation occurs in the input voltage or the input current, therefore, power supply to the discharge lamp is neither stopped nor permitted if the cycle is shorter than a predetermined time, thus preventing an adverse affect on the service life of the discharge lamp or a reduction in the visibility of the light from the discharge lamp from occurring by the repetitive flickering of the discharge lamp in a short period. Even when the input voltage and/or the input current significantly varies, power supply to the discharge lamp is not instantaneously stopped but power is supplied to the discharge lamp, for example, when the input voltage and/or the input current is promptly restored to a predetermined range immediately after the variation has occurred.

According to the third aspect of the invention, when the state where the value of the input voltage and/or the value of the input current is equal to or smaller than the first reference value or the first reference range continues for the predetermined time or longer and when the discharge lamp is in the light-OFF state, power supply to the discharge lamp is inhibited. It is therefore possible to maintain the light-ON state of the discharge lamp by keeping supplying power to the discharge lamp unless the discharge lamp is turned off even if the input voltage drops.

According to the fourth aspect of the invention, when detecting an abnormality, the abnormality detection means stops the operation of the power supply circuit or inhibits power supply to the individual sections of the lighting circuit from the power supply circuit to thereby stop power supply to the discharge lamp. This feature can contribute to reducing the cost of the lighting circuit.

Although several embodiments of the present invention have been described herein, it should be apparent to those skilled in the art that the present invention may be embodied in many other specific forms without departing from the spirit or scope of the invention.

Therefore, the present examples and embodiments are to be considered as illustrative and not restrictive and the invention is not limited to the details given herein, but may be modified within the scope and equivalence of the appended claims.

What is claimed is:

1. A lighting circuit for a discharge lamp, comprising:

abnormality detection means for detecting an input voltage and/or an input current to be input to a lighting circuit from a power supply, said abnormality detection means having a first reference value or reference range for comparison and a second reference value or reference range both to be set for said input voltage and/or said input current;

a power supply circuit for supplying a stable supply voltage and/or reference voltage necessary for an operation of a circuit section associated with lighting control of said discharge lamp based on said input voltage to said lighting circuit;

said abnormality detection means comprising an input-voltage abnormality detector for detecting an abnormality in a battery voltage and stopping an operation of said power supply circuit upon detection of an abnormality in said battery voltage, thereby inhibiting power supply to said discharge lamp, said input-voltage abnormality detector comprising a first circuit associated with detection of a voltage drop, a second circuit associated with detection of an overvoltage and a first OR gate for receiving output signals of said first and second circuits;

wherein said first circuit includes a first comparator, a first delay circuit and an AND gate having one input terminal directly supplied with an output signal of said first comparator and an other input terminal supplied via said first delay circuit with said output signal of said first comparator, an output of said AND gate being supplied to said first OR gate; and said second circuit includes a second comparator, a second delay circuit and a second OR gate having one input terminal directly supplied with an output signal of said second comparator and an other input terminal supplied via said second delay circuit with said output signal of said second comparator, an output of said second OR gate being supplied to said first OR gate;

whereby said abnormality detection means stops power supply to said discharge lamp when a state where a value of said input voltage and/or a value of said input current is equal to or smaller than said first reference value or said first reference range continues for a predetermined time or longer, and permits power supply to said discharge lamp when a state where said value of said input voltage and/or said value of said input current is equal to or greater than said second reference value or said second reference range continues for a predetermined time or longer.

2. The lighting circuit according to claim 1, wherein said first and second comparators have hysteresis characteristics.

3. A lighting circuit for a discharge lamp, comprising:

abnormality detection means for detecting an input voltage and/or an input current to be input to a lighting circuit from a power supply and stopping power supply to a discharge lamp when detecting an abnormality in said input voltage and/or said input current;

said abnormality detection means having first, second, third and fourth reference values to be set for said input voltage and/or said input current, whereby said abnormality detection means (a) includes a first circuit for producing a first high signal Sc when a value of said input voltage and/or a value of said input current is equal to or smaller than said first reference value $V_1$ and that becomes low if the value of said input voltage and/or said value of said input current is equal to or greater than said second reference value $V_2$, producing a second high signal Sd, which corresponds to the first high signal Sc, and is offset for a time interval Td, and carrying out a logic operation with the first and second high signals Sc and Sd thereby producing a third signal, whereby the power supply to said discharge lamp is interrupted when the third signal is high and/or (b) includes a second circuit for producing a fourth high signal Sc' when a value of said input voltage and/or a value of said input current becomes equal to or greater than said third reference value $V_1$' whereby said fourth high signal Sc' becomes low when said value of said input voltage and/or said value of said input current is equal to or smaller than said fourth reference value $V_2$', producing a fifth signal Sd', that starts when the fourth high signal Sc' becomes low and that has a predetermined length Td', and carrying out a logic operation with the fourth and fifth signals Sc' and Sd', thereby producing a sixth signal, whereby the power supply to said discharge lamp is interrupted when the sixth signal is high.

4. The lighting circuit according to claim 3, further comprising light-OFF detection means for detecting a light-OFF state of said discharge lamp; and wherein when a state where said value of said input voltage and/or said value of said input current is equal to or smaller than said first reference value or a first reference range continues for said predetermined time or longer and when said discharge lamp is in said light-OFF state, said abnormality detection means stops power supply to said discharge lamp.

5. The lighting circuit according to claim 3, wherein a power supply circuit for supplying a stable supply voltage and/or reference voltage necessary for an operation of a circuit section associated with lighting control of said discharge lamp based on said input voltage to said lighting circuit is provided; and said abnormality detection means inhibits an operation of said power supply circuit or power supply to said circuit section to thereby stop power supply to said discharge lamp.

6. The lighting circuit according to claim 4, wherein a power supply circuit for supplying a stable supply voltage and/or reference voltage necessary for an operation of a circuit section associated with lighting control of said discharge lamp based on said input voltage to said lighting circuit is provided; and said abnormality detection means inhibits an operation of said power supply circuit or power supply to said circuit section to thereby stop power supply to said discharge lamp.

7. The lighting circuit according to claim 3, wherein said first circuit includes a first comparator, a first delay circuit and an AND gate having one input terminal directly supplied with an output signal of said first comparator and another input terminal supplied via said first delay circuit with said output signal of said first comparator, an output of said AND gate being supplied to first OR gate; and said second circuit includes a second comparator, a second delay circuit and a second OR gate having one input terminal directly supplied with an output signal of said second comparator and an other input terminal supplied via said second delay circuit with said output signal of said second comparator, an output of said second OR gate being supplied to said first OR gate.

8. The lighting circuit according to claim 7, wherein said first and second comparators have hysteresis characteristics.

9. The lighting circuit according to claim 6, wherein said first circuit includes a first comparator, a first delay circuit and an AND gate having one input terminal directly supplied with an output signal of said first comparator and another input terminal supplied via said first delay circuit with said output signal of said first comparator, an output of said AND gate being supplied to said first OR gate; and said second circuit includes a second comparator, a second delay circuit and a second OR gate having one input terminal directly supplied with an output signal of said second comparator and an other input terminal supplied via said second delay circuit with said output signal of said second comparator, an output of said second OR gate being supplied to said first OR gate.

10. The lighting circuit according to claim 9, wherein said first and second comparators have hysteresis characteristics.

* * * * *

UNITED STATES PATENT AND TRADEMARK OFFICE
CERTIFICATE OF CORRECTION

PATENT NO. : 5,907,224

DATED : May 25, 1999

INVENTOR(S) : MASAYASU YAMASHITA ET AL.

It is certified that error appears in the above-identified patent and that said Letters Patent is hereby corrected as shown below:

COLUMN 5

Line 42, "become" should read --becomes--.

COLUMN 7

Line 45, "supply 25" should read --supply circuit 25--.

COLUMN 9

Line 45, "affect" should read --effect--.

COLUMN 10

Line 43, "an other" should read --another--; and
Line 50, "an other" should read --another--.

COLUMN 11

Line 25, "high" should read --high,--.

UNITED STATES PATENT AND TRADEMARK OFFICE
CERTIFICATE OF CORRECTION

PATENT NO. : 5,907,224

DATED : May 25, 1999

INVENTOR(S) : MASAYASU YAMASHITA ET AL.

It is certified that error appears in the above-identified patent and that said Letters Patent is hereby corrected as shown below:

<u>COLUMN 12</u>

Line 29, "an other" should read --another--; and
Line 45, "an other" should read --another--.

Signed and Sealed this

Twenty-first Day of December, 1999

*Attest:*

Q. TODD DICKINSON

*Attesting Officer*     *Acting Commissioner of Patents and Trademarks*